(12) United States Patent
Keefer et al.

(10) Patent No.: US 7,327,352 B2
(45) Date of Patent: Feb. 5, 2008

(54) LINEARIZED CONDUCTIVE SURFACE

(75) Inventors: Kenneth J. Keefer, Westford, MA (US); Bülent Bulat, Framingham, MA (US); Bernard O. Geaghan, Salem, NH (US)

(73) Assignee: 3M Innovative Properties Company, St. Paul, MN (US)

( * ) Notice: Subject to any disclaimer, the term of this patent is extended or adjusted under 35 U.S.C. 154(b) by 877 days.

(21) Appl. No.: 10/172,396

(22) Filed: Jun. 14, 2002

(65) Prior Publication Data

US 2003/0230438 A1    Dec. 18, 2003

(51) Int. Cl.
*G06F 3/41* (2006.01)
(52) U.S. Cl. ............... 345/173; 178/18.01; 178/18.03; 178/18.05; 178/18.06
(58) Field of Classification Search ........ 345/173–178; 178/18.01–18.11
See application file for complete search history.

(56) References Cited

U.S. PATENT DOCUMENTS

| | | | |
|---|---|---|---|
| 4,198,539 A | 4/1980 | Pepper, Jr. | |
| 4,293,734 A | 10/1981 | Pepper, Jr. | |
| 4,371,746 A | 2/1983 | Pepper, Jr. | |
| 4,822,957 A * | 4/1989 | Talmage et al. | 178/18.05 |
| 4,822,958 A | 4/1989 | Van Laere | |
| 5,045,644 A * | 9/1991 | Dunthorn | 178/18.05 |
| 6,163,313 A * | 12/2000 | Aroyan et al. | 345/173 |
| 6,506,983 B1 * | 1/2003 | Babb et al. | 178/18.01 |
| 6,593,916 B1 * | 7/2003 | Aroyan | 345/173 |
| 2005/0146509 A1 * | 7/2005 | Geaghan et al. | 345/173 |

FOREIGN PATENT DOCUMENTS

EP    1 172 831 A2    1/2002

OTHER PUBLICATIONS

U.S. Appl. No. 09/169,391, filed Oct. 9, 1998, Touch Panel With Improved Linear Response and Minimal Border Width Electrode Pattern.

* cited by examiner

*Primary Examiner*—David L. Lewis
(74) *Attorney, Agent, or Firm*—Robert S. Moshrefzadeh

(57) ABSTRACT

Electrode pattern disposed on a conductive surface is disclosed. The electrode pattern includes a plurality of conductive segments. The conductive segments are located along the edges of two or more concentric parallel polygons. Each edge of each polygon has one or more middle segments disposed between two end segments. For each edge of each polygon the middle segments are equal in length, and the segments are equally spaced. A touch sensor is disclosed that includes such an electrode pattern.

55 Claims, 12 Drawing Sheets

LINEARIZED CONDUCTIVE SURFACE

FIELD OF THE INVENTION

This invention generally relates to forming a conductive electrode pattern on a transparent conductive surface. The invention is particularly applicable to linearizing an electric field on a conductive surface in a touch panel by forming an electrode pattern on and along the perimeter of the surface.

BACKGROUND

Touch screens allow a user to conveniently interface with an electronic display system. For example, a user can carry out a complicated sequence of instructions by simply touching the screen at a location identified by a pre-programmed icon. The on-screen menu may be changed by re-programming the supporting software according to the application.

Resistive and capacitive are two common touch sensing employed to detect the location of a touch input. Resistive technology typically incorporates two transparent conductive films as part of an electronic circuit that detects the location of a touch. Capacitive technology, on the other hand, typically uses a single transparent conductive film to detect the location of an applied touch.

A touch location is generally determined by applying an electric field to a transparent conductive surface in the touch area. Where the transparent conductor is an electrically continuous coating in the touch area, the accuracy of detecting the location of an applied touch depends on the linearity of the electric field in the transparent conductor.

Various methods have been proposed to linearize the electric field. For example, in a four wire resistive touch technology, a pair of highly conductive continuous electrode bars are formed onto a transparent conductive surface at two opposite edges of a touch surface. A differential voltage applied to the two conductive bars results in a fairly linear electric field in the plane of the transparent conductive surface in the direction normal to the two electrode bars. Similarly, a second pair of highly conductive electrode bars are formed on a second conductive surface with the bars being orthogonal to the first pair of bars.

As another example, five wire resistive or capacitive touch sensors employ an electrode pattern that may be formed on a transparent conductive surface along the perimeter of a touch area to linearize the field. In a five wire resistive touch sensor, a second transparent conductor can act as a current sink or voltage probe and may not require linearization. In a five wire capacitive touch sensor, a user's finger or other conductive implement may provide the current sink. The electrode pattern is typically made up of a number of discrete conductive segments positioned in such a way as to generate a linear orthogonal field in the plane of the transparent conductor.

Typically, the linearizing electrode pattern includes several rows of discrete conductive segments positioned along the perimeter of a touch area, such as disclosed in U.S. Pat. Nos. 4,198,539; 4,293,734; and 4,371,746. The conductive segments are typically electrically connected to each other via the conductive surface they are deposited IS on. U.S. Pat. No. 4,822,957 discloses rows of discrete electrodes having varying lengths and spacings to linearize the electric field in a touch area.

Several factors can determine the efficacy of a linearization pattern. One such factor is the degree to which the field can be linearized. Some electrode patterns may be incapable of linearizing the field to a level required in a given application. Another factor is the overall width of the electrode pattern. Linearity of the electric field can, in general, be improved by increasing the number of rows of electrodes. Increasing the number of rows, however, tends to increase the touch panel border. This may be so because the electrode pattern is typically made of highly conductive opaque materials, such as metals, and is, therefore, placed outside the touch area as to not interfere with the viewing of displayed information. Therefore, improving field linearity may adversely affect the border size of a touch panel.

Another factor is sensitivity of field linearity to small variations in the electrode pattern. Such variations are typically unavoidable during manufacturing. If small variations in the electrode pattern result in unacceptable nonlinearity in the electric field, the yield and hence the cost of manufacturing a touch sensor may be adversely affected. Known linearization patterns may be limited by how effective they are in linearizing the electric field, and/or they may require a wider border to effectively linearize the field or compensate for dimensional errors introduced during manufacturing, and, as a result, may involve high manufacturing costs.

SUMMARY OF THE INVENTION

Generally, the present invention relates to forming a conductive electrode pattern on a conductive surface. The present invention also relates to linearizing an electric field.

In one aspect of the invention an article includes two or more polygonal parallel rows of conductive segments disposed on a transparent conductive surface. Each edge of each row has two end conductive segments and one or more middle conductive segments. The middle conductive segments along a given edge in a given row are substantially equal in length. The gaps along a given edge in a given row are also substantially equal in length. The length of middle segments in an inner rows along a given edge is smaller than the length of middle segments in an outer row along the same edge. At least one conductive segment in a row is connected to at least one conductive segment in another row.

In another aspect of the invention two or more rows of conductive segments are disposed along the inside of a polygonal perimeter of a conductive surface. Each row has one edge for each edge of the polygon. Each edge of each row has two end segments and one or more middle segments. The middle segments of each edge of each row are substantially equal in length. All segments of each edge of each row are substantially equal in spacing. For each edge, the length of middle conductive segments are smaller when moving from outer to inner rows. At least one conductive segment in a row is connected to at least one conductive segment in another row.

In another aspect of the invention a touch includes a conductive surface onto which two or more parallel polygonal rows of conductive segments are disposed. Each edge of each row has one or more middle conductive segments and two end segments. The middle segments along each edge of each row are substantially of equal length, and the gaps between the segments along each edge of each row are substantially of equal length.

In another aspect of the invention an optical system includes a display and a touch sensor, where the touch sensor includes an electrode pattern according to an embodiment of the present invention.

In another aspect of the invention an article includes a plurality of conductive segments that are in contact with a conductive surface. The conductive segments are located along the edges of two or more concentric parallel polygons, where each edge of each polygon includes one or more middle segments disposed between two end segments. For each edge of each polygon the middle segments are substantially equal in length and the segments are substantially spaced equally.

BRIEF DESCRIPTION OF DRAWINGS

The invention may be more completely understood and appreciated in consideration of the following detailed description of various embodiments of the invention in connection with the accompanying drawings, in which.

DETAILED DESCRIPTION

Figure 1:
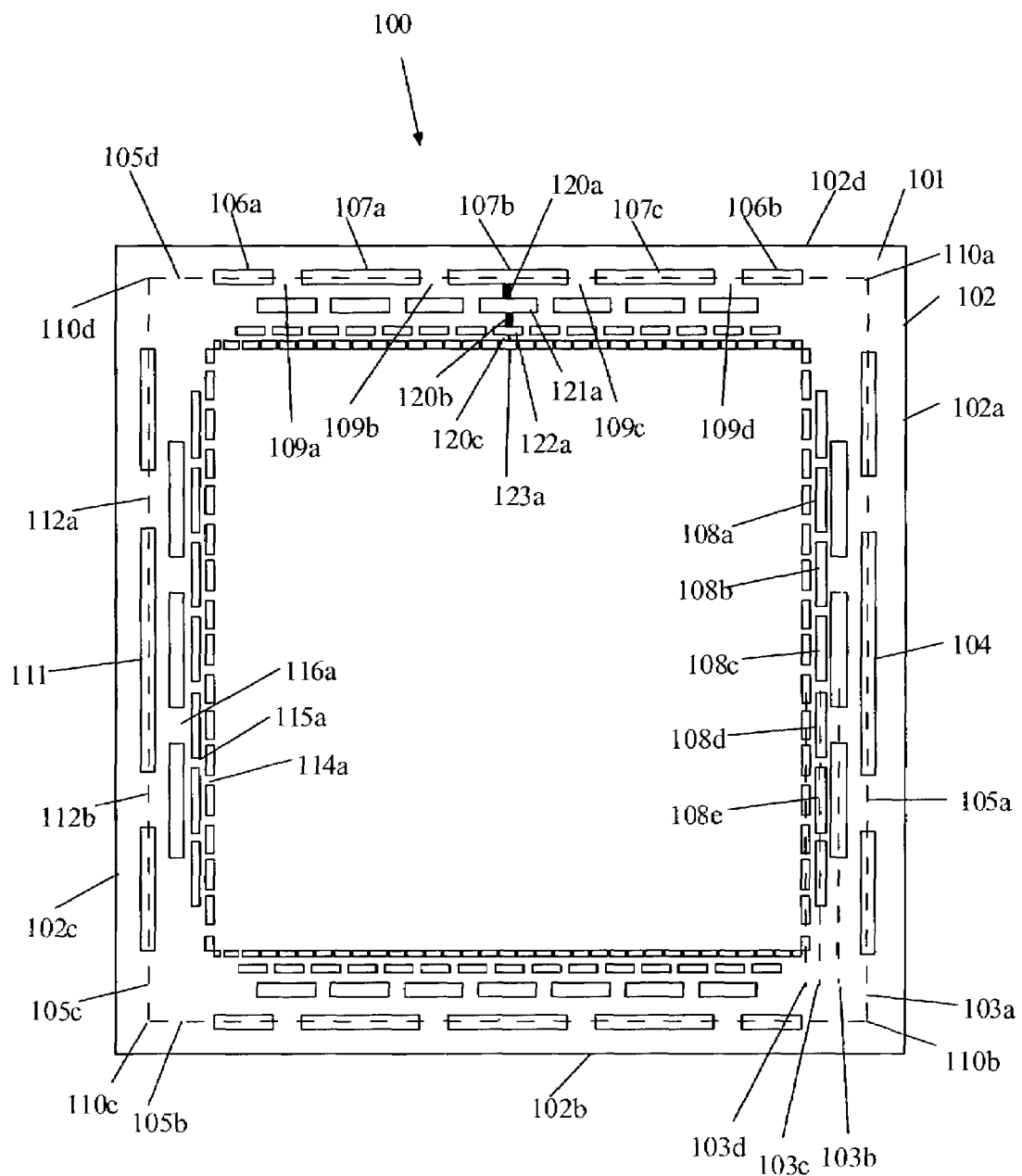
FIG. 1 illustrates a schematic top view of an electrode pattern in accordance with an embodiment of the invention.

The present invention generally relates to forming a conductive electrode pattern onto a transparent conductive surface for the purpose of linearizing an electric field in an area of the conductive surface. The invention is particularly applicable to touch sensors employing an electrode pattern disposed on a conductive surface to linearize the electric field in the touch area of the sensor in order to more accurately determine the location of an applied touch. The invention is also particularly applicable to transparent touch sensors for use with displays where it is desirable for the touch sensor to have high resolution, low manufacturing cost, reduced border width, and increased touch area.

A touch screen functions on the general principle that an otherwise open electrical circuit is closed when a touch is applied. The properties of a signal generated in the closed circuit allows detection of a touch location. Various technologies may be employed to detect a touch location. One such technology is resistive. In a resistive touch, an applied touch brings two otherwise physically separated conductive films into direct physical contact with one another. The physical contact closes an otherwise open electronic circuit, thereby resulting in generation of a resistively coupled electrical signal. The properties of the generated signal allow detection of the touch location.

Capacitive is another technology commonly used to detect location of a touch. In this case, a signal is generated when a conductive touch implement, such as a user's finger or a conductive stylus, is brought sufficiently close to a conductive film to allow capacitive coupling between the two conductors. Properties of the generated signal allow detection of the touch location.

The present invention is applicable to touch sensing screens where the electric field in the touch area is preferably linearized for more accurate detection of the location of an applied touch. The present invention is particularly applicable to touch screens utilizing resistive or capacitive technologies where an electric field is linearized in one or more directions in a plane of a transparent conductor. U.S. Pat. Nos. 4,198,539; 4,293,734; 4,371,746; and 4,822,957 disclose linearizing electrode patterns disposed on the perimeter of a touch area. Commonly owned U.S. patent application Ser. No. 09/169,391 discloses electrode patterns for improving linearity of a touch panel. The electrode patterns disclosed in U.S. Ser. No. 09/169,391 include rows of conductive segments disposed on the border of a resistive layer where every row has at least two conductive segments, each of which faces at least a portion of three conductive segments in an adjacent row. The present invention discloses new electrode patterns that improve field linearity without the trade-offs of a larger border width or an increased manufacturing cost. The electrode patterns provided in the present invention are particularly suitable for use in touch sensors where improved field linearity is desirable for more accurate detection of the location of a touch input.

Unless otherwise indicated all figures and drawings in this document are schematic, dimensions are not to scale, and are chosen for the purpose of illustrating different aspects of the invention.

FIG. 1 shows a schematic top view of an article 100 according to one particular embodiment of the present invention. Article 100 includes a transparent conductor 101. In the embodiment shown in FIG. 1, perimeter 102 of the transparent conductor 101 is a rectangle. In general, perimeter 102 can be any polygon such as a rectangle, a square, a triangle, etc. In FIG. 1, perimeter 102 is made up of four edges 102a, 102b, 102c, and 102d. Article 100 also includes two or more rows of discrete conductive segments disposed along perimeter 102 on the transparent conductor 101. In particular, FIG. 1 shows four such parallel rows 103a, 103b, 103c, and 103d although, in general, two or more rows can be present. Each row, such as row 103a, has the same polygonal shape as the perimeter 102 of the transparent conductor 101 and includes the same number of edges and vertices as perimeter 102. For example, row 103a is a rectangle and includes four edges 105a, 105b, 105c, 105d, and four vertices 101a, 101b, 101c, and 101d.

According to the present invention, each edge of each row includes a plurality of conductive segments 104, disposed on the transparent conductor along perimeter 102. More specifically, each edge of each row has two end conductive segments, disposed closest to the vertices at the two ends of the edge, and one or more middle conductive segments disposed between the end segments. For example, edge 105d of row 103a has two end conductive segments 106a and 106b, and three middle conductive segments 107a, 107b, and 107c.

The sheet resistance of the conductive segments is generally less than the sheet resistance of the transparent conductor 101. Preferably, the sheet resistance of transparent conductor 101 is substantially more than the sheet resistance of the conductive segments. The sheet resistance of transparent conductor 101 is preferably at least ten times greater than the sheet resistance of the conductive segments. In some embodiments of the present invention, the sheet resistance of transparent conductor 101 is preferably at least one hundred times greater than the sheet resistance of the conductive segments.

Transparent conducting film 101 can be a semiconductor, doped semiconductor, semi-metal, metal oxide, an organic conductor, a conductive polymer, or the like. Exemplary inorganic materials include transparent conductive oxides, for example indium tin oxide (ITO), tin antimony oxide (TAO), and the like. Exemplary organic materials include conductive organic metallic compounds as well as conductive polymers such as polypyrrole, polyaniline, polyacetylene, and polythiophene, including those disclosed in European Patent Publication EP-1-172-831-A2. The conductive segments can be opaque, semi-transparent, or nearly transparent. The conductive segments can be metal such as silver, gold, copper, aluminum, lead, and the like, or a combination of metals. The conductive segments can include carbon or other additives to make the segments conductive or more conductive. The conductive segments can be deposited onto transparent conductor 101 using ink jet printing, screen printing, or any other suitable method for depositing the conductive segments onto the transparent conductor. The conductive segments can be patterned using photolithography, ink jet printing, laser ablation, photo-bleaching, or any other suitable patterning method.

According to the present invention, different conductive segments can conduct different amounts of electric current. For example, the conductive segments in an outer row can be more conductive than the conductive segments in an inner row. As another example, for a given edge in a given row, the end segments can be more conductive than the middle segments. A conductive segment can be made more conductive by increasing its width, thickness, or by using a more conductive material to make the segment.

According to one aspect of the present invention, some of the conductive segments may be substantially transparent. For example, some of the inner rows may include transparent conductors, while some of the outer rows may include nontransparent conductive segments. For example, in reference to FIG. 1, the two inner rows can be made of transparent conductive segments, and the two outer rows can be made of opaque conductive segments. According to this aspect of the present invention, the two inner rows can be included in the touch area of a touch sensor, hence increasing the viewing area, without interfering with the viewing of displayed information.

According to the present invention, the middle conductive segments of each edge of each row are substantially equal in length. For example, conductive segments 107a, 107b, and 107c are substantially equal in length. As another example, middle conductive segments 108a, 108b, 108c, 108d, and 108e of the right edge of row 103c are substantially equal in length. In general, for a given row, the middle segments along one edge need not be equal in length to the middle segments along another edge. For example, middle segment 107b of the top edge of row 103a, in general, can have a different length than middle segment 111 of the left edge of the same row. In some embodiments of the present invention, however, the middle segments belonging to different edges in a given row can also be substantially equal in length.

In general, for a given edge of a given row, the middle conductive segments need not be equal in length to the corner segments. For example, the length of conductive segment 107a need not be equal to the length of conductive segment 106a. However, in some embodiments of the present invention, end and middle segments along an edge of a given row can be equal in length.

According to the present invention, for each edge of each row, the conductive segments are separated by gaps of substantially equal length. For example, for edge 105d of row 103a, gaps 109a, 109b, 109c, and 109d are substantially of equal length. According to the present invention, substantially equal gaps between the conductive segments in each edge of each row improves linearity.

For the purposes of this invention, field linearity is defined in terms of the departure of the field from a linear electric field. Field linearity can further be defined in terms of linear equipotential lines. The electric field according to the present invention is preferably linearized to within 2%, more preferably to within 1%, even more preferably to within 0.5%, and still even more preferably to within 0.1%. According to the present invention, an electric field in a touch area can be linearized by applying different magnitude signals, such as voltages, to different vertices of the polygon. For example, for a rectangular electrode pattern, the electric field can be linearized by applying a signal, such as voltage $V_1$, to two neighboring vertices, and a different signal, such as voltage $V_2$, to the other two vertices. As another example, for a triangular electrode pattern, the electric field can be linearized by applying a first signal, such as voltage $V_a$ to a first vertex, a second signal, such as voltage $V_b$ to a second vertex, and a third signal, such as voltage $V_c$, to the third vertex, where the three signals, such as voltages $V_a$, $V_b$, and $V_c$ can be different in magnitude.

In general, for a given row, gaps along one edge need not be equal in length to gaps along another edge of the same row. For example, for row 103a, gap 109a need not be equal to gap 112a. However, in some embodiments of the present invention, for a given row, gaps along one edge can be equal to gaps along another edge of the same row. Alternatively, for a given row, gaps along some of the edges can be equal and gaps along other edges may be unequal in length. For example, for a given row in a rectangular electrode pattern, gaps along opposing edges may be equal in length, and gaps along adjoining edges may be different in length.

For convention, for two given rows, the row that is closer to perimeter 102 of conductive surface 101 is referred to as an outer row, and the row that is farther from perimeter 102 is referred to as an inner row. The outermost and innermost rows refer to the rows closest to and farthest from perimeter 102, respectively. According to the present invention, for any given edge, the length of conductive middle segments in any inner row is smaller than the length of conductive middle segments in any outer row. In other words, for a given edge, the length of conductive middle segments becomes progressively smaller moving from outer to inner rows. For example, referring to FIG. 1, for any given edge, conductive middle segments in row 103d are smaller than those in row 103c, conductive middle segments in row 103c are smaller than those in row 103b, and conductive middle segments in row 103b are smaller than those in row 103a.

According to the present invention, one or more segments in a given row are connected to one or more segments in an adjacent row via one or more conductive bars. For example, referring to FIG. 1, segment 107b in row 103a is connected to segment 121a in row 103b via conductive bar 120a, segment 121a in row 103b is connected to segment 122a in row 103c via conductive bar 120b, and segment 122a in row 103c is connected to segment 123a in row 103d via conductive bar 120c. The conductive bars are preferably made of the same material as the conductive segments. In addition, conductive bars preferably have substantially the same sheet resistance as the conductive segments. Although, in some embodiments of the present invention, some or all conductive bars can be made of a material and/or have sheet resistance that is different than those of some or all of the conductive segments.

Figure 2:
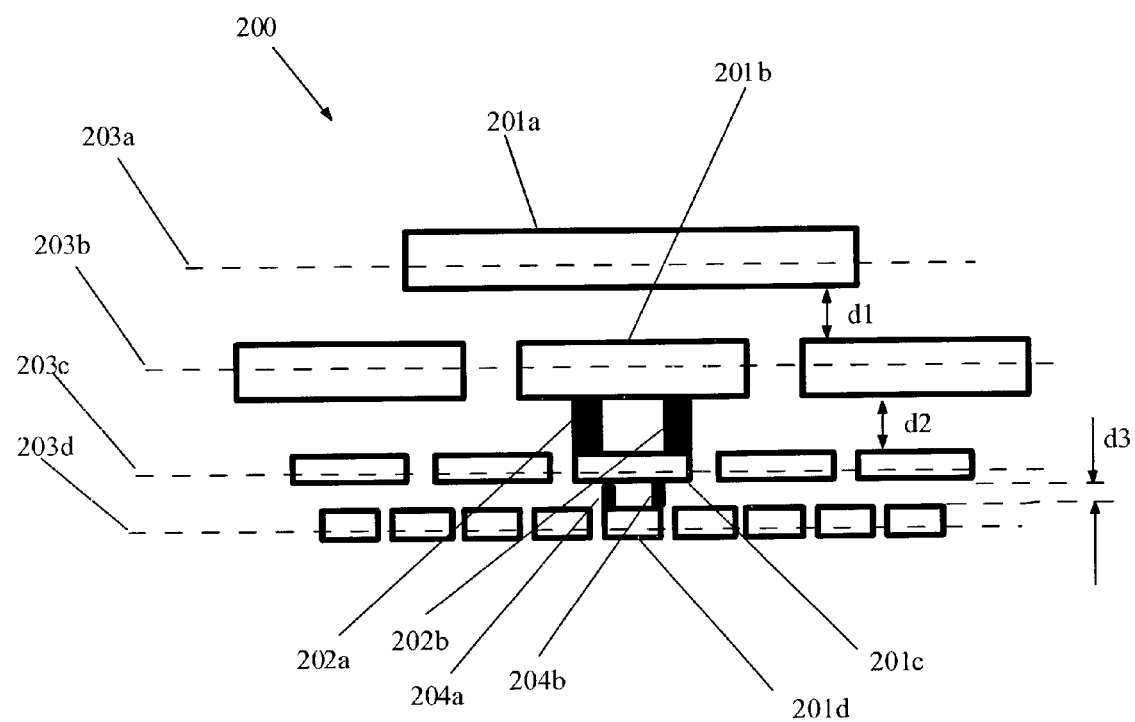
FIG. 2 illustrates a schematic top view of a portion of an electrode pattern in accordance with another embodiment of the invention in which conductive segments in adjacent rows are connected via connecting conductive bars.

A portion of the electrode pattern 100 of FIG. 1 is shown schematically as electrode pattern 200 in FIG. 2 for the purpose of further illustrating aspects of the present invention related to connecting conductive segments in adjacent rows. The remaining portion of the electrode pattern 200 is not shown in FIG. 2 for simplicity and without any loss of generality. FIG. 2 shows portions of four rows of electrodes 203a, 203b, 203c, and 203d. Row 203a has conductive segment 201a, row 203b has three conductive segments including segment 201b, row 203c has five conductive segments including segment 201c, and row 203d has nine conducive segments including segment 201d. Conductive segment 201b is connected to conductive segment 201c via conductive connecting bars 202a and 202b positioned at endpoints of segment 201c. Similarly, conductive segments 201c and 201d are connected via conductive connecting bars 204a and 204b positioned at endpoints of segment 201d. The exemplary connecting conductive bars shown in FIG. 2 are rectangular in shape and are disposed perpendicular to the conductive segments they connect. In general, connecting conductive bars can have different shapes and assume different orientations with respect to the conductive segments they connect.

Figure 3:
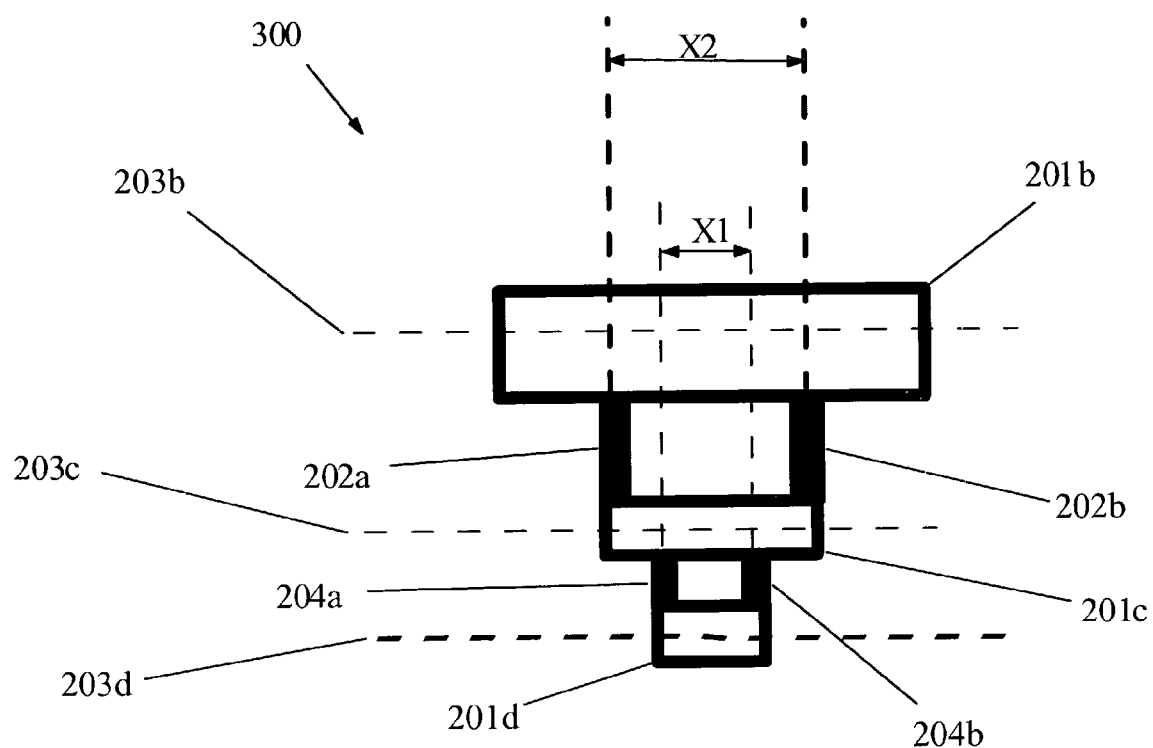
FIG. 3 illustrates a schematic top view of a magnified part of the electrode pattern in FIG. 2.
Figure 4:
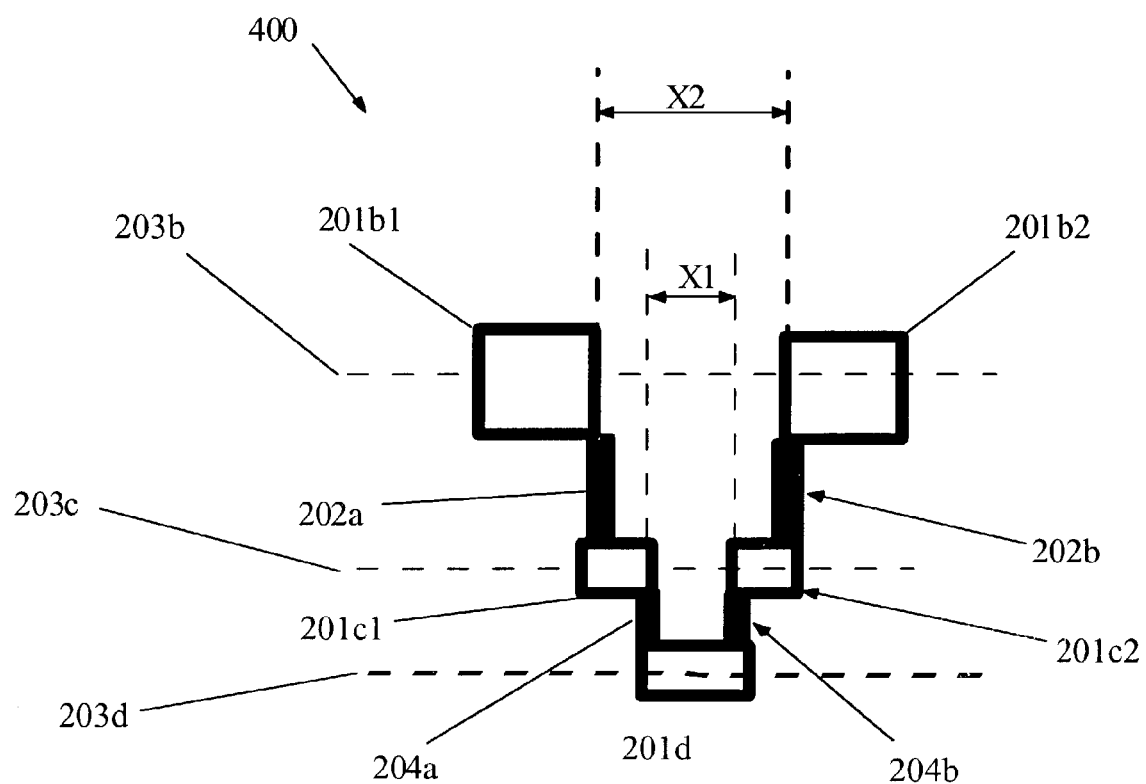
FIG. 4 illustrates a schematic top view of the electrode pattern in FIG. 3 in which electrically non-functional portions of connected conductive segments have been removed.

As discussed, the conductive segments and connecting bars in FIG. 2 are preferably made of the same material and have substantially the same sheet resistance. However, in certain embodiments of the present invention, the constituting material and/or the sheet resistance of one or more connecting bars can be different than the material make up and/or the sheet resistance of one or more of the conductive segments. For ease of illustration, the portions of electrode pattern 200 that includes conductive segments 201b, 201c, 201d, and conductive connecting bars 202a, 202b, 204a, and 204b is magnified and shown in FIG. 3. By connecting segments in adjacent rows the field uniformity can be substantially improved. As illustrated in FIG. 3, a portion of segment 201b, the portion contained within connecting bars 202a and 202b and designated as X2, forms a parallel connection with segment 201c. If the sheet resistance of conductive segments 201b and 201c is significantly less than the sheet resistance of the transparent conductor on which the segments are disposed (transparent conductor not identified in FIG. 3), then the X2 portion of segment 201b can be removed from the electrode pattern with very little or no effect on field linearity, and with the benefit of using less conductive material. Similarly, if the sheet resistance of conductive segments 201c and 201d is significantly less than the sheet resistance of the transparent conductor on which the segments are disposed, then the X1 portion of segment 201c may be removed. Portions of a conductive segment that can be removed with very little or no effect on field linearity are considered electrically non-functional portions. X1 and X2 are two such portions. The result of removing segments X1 and X2 is shown in FIG. 4 where after removing segment X2, segment 201b is left with segments 201b1 and 201b2, and after removing segment X1, segment 201c is left with segments 201c1 and 201c2. The electrode construction shown in FIG. 4 may be referred to as a "castle." FIGS. 2 through 4 illustrate a more general aspect of the present invention that, for segments in adjacent rows that are connected via one or more conductive connecting bars, any electrically non-functional portions of the connected conductive segments may be removed. Referring back to FIG. 3, with appropriate relative magnitudes of the sheet resistance of the transparent conductor, the conductive segments, and the conductive connecting bars, portions X1 and X2 can become electrically non-functional and, therefore, can be removed with no or little effect on field uniformity.

According to the present invention, it is preferable that when two segments from adjacent rows are connected via conductive connecting bars, that one segment fully overlaps the other segment. For example, referring to FIG. 1, in connecting segments 121a and 107b, segment 107b fully overlaps segment 121a, and in connecting segments 121a and 122a, segment 121a fully overlaps segment 122a, and in connecting segments 122a and 123a, segment 122a fully overlaps segment 123a. As another example, referring to FIG. 2, in connecting segments 201b and 201c, segment 201b fully overlaps segment 201c, and in connecting segments 201c and 201d, segment 201c fully overlaps segment 201d. In certain aspects of the present invention, a conductive segment might only partially overlap a segment in an adjacent row to which it is connected. In yet some other aspects of the present invention, there may be no overlap between segments from adjacent rows that are connected to each other.

For a given edge, the following equations may be used to relate the length and number of middle conductive segments and gaps in adjacent rows:

$$l_i + g_i = 2(l_{i+1} + g_{i+1}) \quad (1)$$

$$n_{i+1} = 2n_i \pm 1 \quad (2)$$

$$k_{i=ki+1} - 1 \quad (3)$$

where i is the row number, row (i+1) being adjacent to and inside of row i;

$l_i$ is the length of middle conductive segments in row i;

$l_{i+1}$ is the length of middle conductive segments in row (i+1);

$g_i$ is the gap length between conductive segments in row i;

$g_{i+1}$ is the gap length between conductive segments in row (i+1);

$n_i$ is the number of middle conductive segments in row i;

$n_{i+1}$ is the number of middle conductive segments in row (i+1);

$k_i$ is the number of gaps in row i; and $k_{i+1}$ is the number of gaps in row (i+1).

Figure 5:
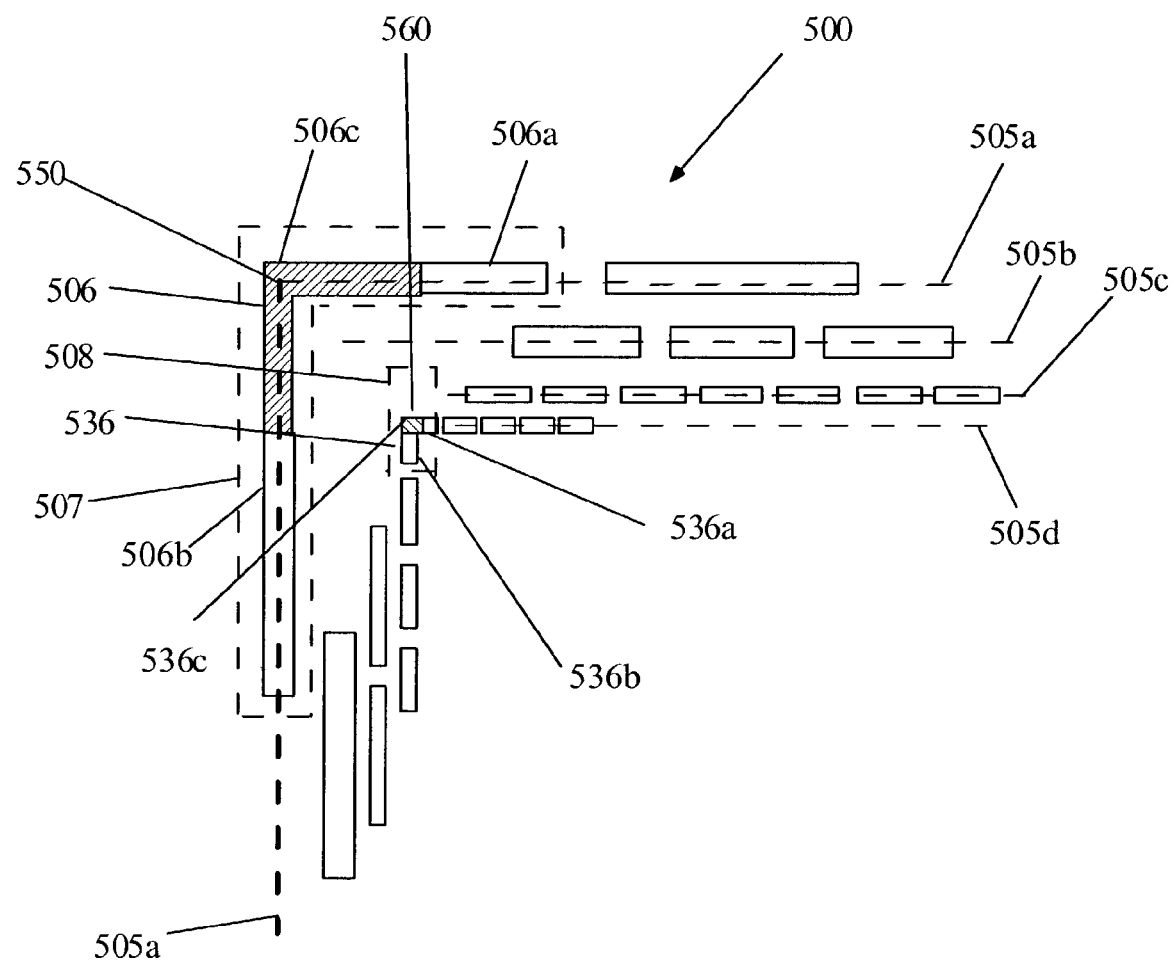
FIG. 5 illustrates a schematic top view of a portion of an electrode pattern in accordance with another embodiment of the invention in which, for a given row, end segments in adjoining edges are connected at the vertex.

According to one aspect of the present invention, for a given row, end segments from adjoining edges can be connected at the vertex. To illustrate this aspect of the invention, a corner portion of an electrode pattern 500 according to one aspect of the invention is schematically shown in FIG. 5. The remaining portion of the electrode pattern 500 is not shown for simplicity and without any loss of generality. Electrode pattern 500 includes rows 505*a*, 505*b*, 505*c*, and 505*d*. End segments 506*a* and 506*b* in row 505*a* are connected at vertex 550 via connecting conductive bar 506*c* to form a corner segment 506 (the L-shaped segment enclosed in dashed line 507). Similarly, end segments 536*a* and 536*b* are connected at vertex 560 via connecting conductive bar 536*c* to form a corner segment 536 (the L-shaped segment enclosed in dashed line 508). Corner segments can improve field linearity and provide for electrical connection to an electronic circuitry as described below.

Figure 6:
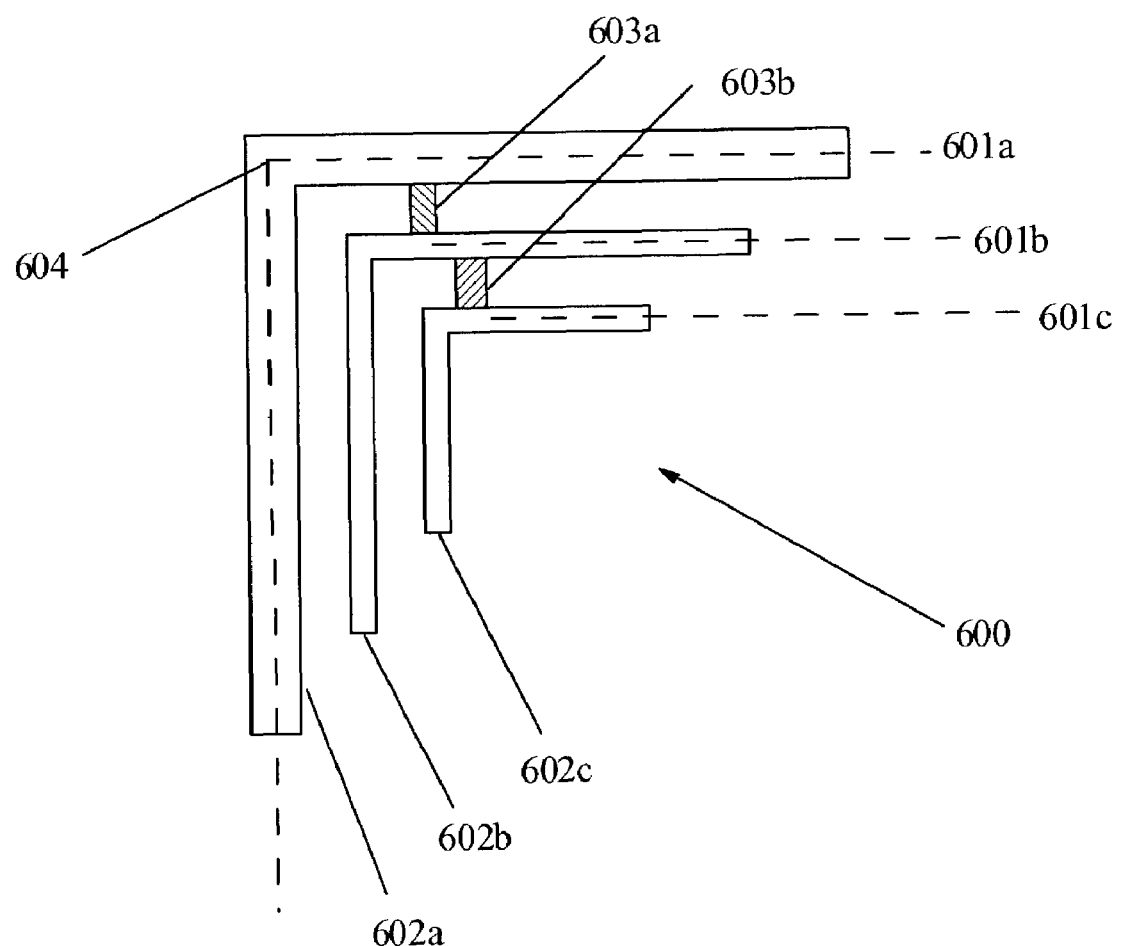
FIG. 6 illustrates a schematic top view of a portion of an electrode pattern in accordance with another embodiment of the invention in which, for a given vertex, corner segments in adjacent rows are connected via connecting conductive bars.

FIG. 6 shows a portion of an electrode pattern 600 according to one aspect of the invention in which corner segments at the same vertex and belonging to adjacent rows may be connected via one or more conductive bars. Exemplary electrode pattern 600 includes three rows of conductive segments 601*a*, 601*b*, and 601*c*. The remaining portion of the electrode pattern 600 is not shown for ease of illustration and without any loss of generality. Electrode pattern 600 also includes three corner segments 602*a*, 602*b*, and 602*c* all at vertex 604. According to one aspect of the present invention, when the electrode pattern includes two or more corner segments at the same vertex, at least two corner segments positioned at the same vertex can be connected to each other via one or more conductive connecting bars. For example, in FIG. 6, corner segments 602*a* and 602*b* are connected via conductive connecting bar 603*a*, and corner segments 602*b* and 602*c* are connected via conductive connecting bar 603*b*.

Figure 7A:
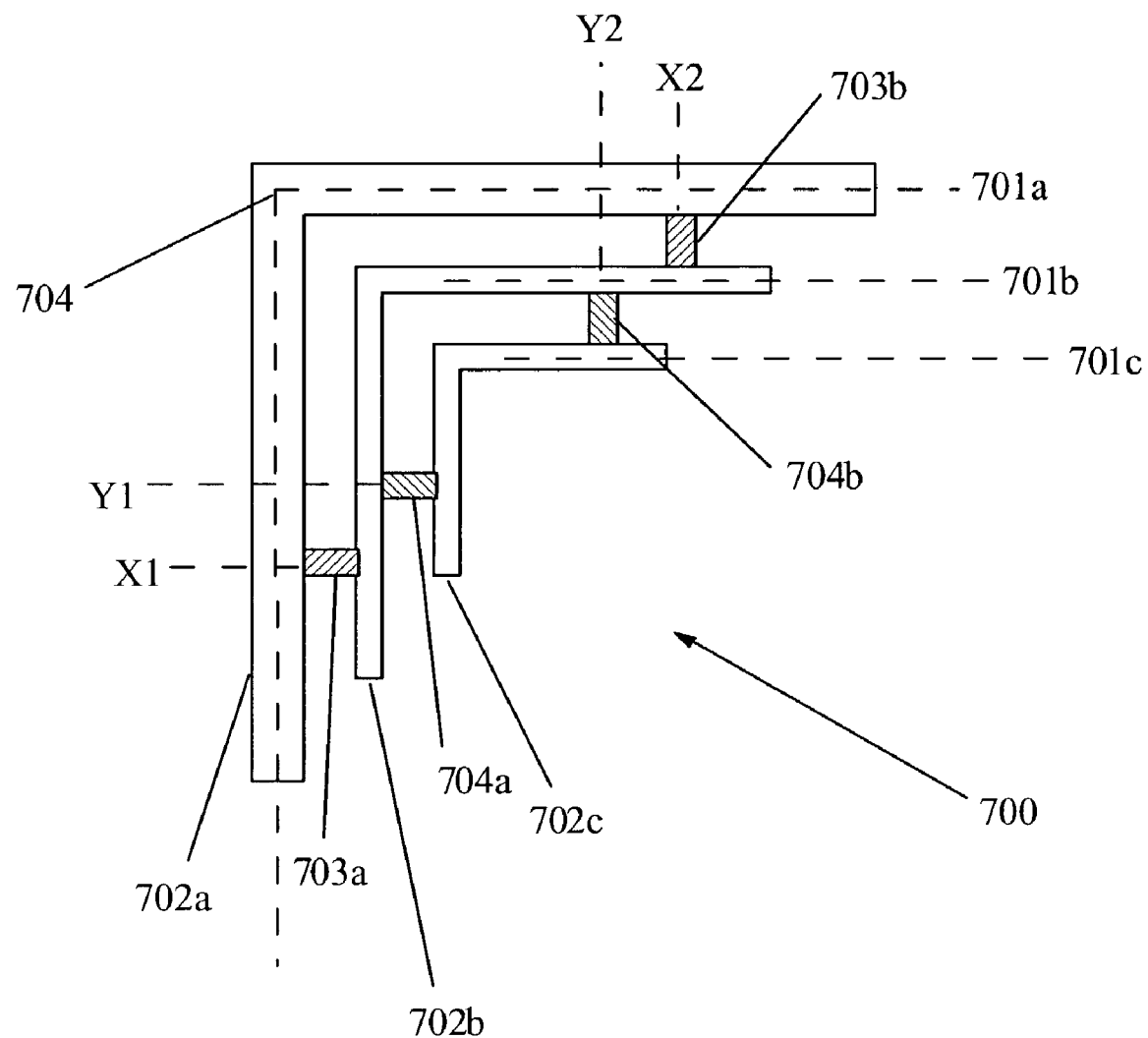
FIG. 7A illustrates a schematic top view of a portion of an electrode pattern in accordance with yet another embodiment of the invention in which, for a given vertex, corner segments in adjacent rows are connected via connecting conductive bars.

The top-view of a portion of an electrode pattern 700 according to another aspect of the invention is schematically shown in FIG. 7. The remaining portion of electrode pattern is not shown for simplicity and without any loss of generality. Electrode pattern 700 includes three rows 701*a*, 701*b*, and 701*c*, and vertex 704. Each row of electrode pattern 700 includes a corner segment at vertex 704. In particular, row 701*a* includes a corner segment 702*a*, row 701*b* includes a corner segment 702*b*, and row 701*c* includes a corner segment 702*c*, all at vertex 704. Corner segments 702*a* and 703*a* are connected to each other via connecting conductive bars 703*a* and 703*b*. Similarly, corner segments 702*b* and 702*c* are connected to each other via connecting conductive bars 704*a* and 704*b*. The conductive connecting bars shown in FIGS. 6 and 7A have rectangular shapes and are disposed perpendicular to the portions of the corner segments they connect. In general, the conductive connecting bars can have other shapes and may be disposed to have other orientations relative to the portions of the segments they connect.

Figure 7B:
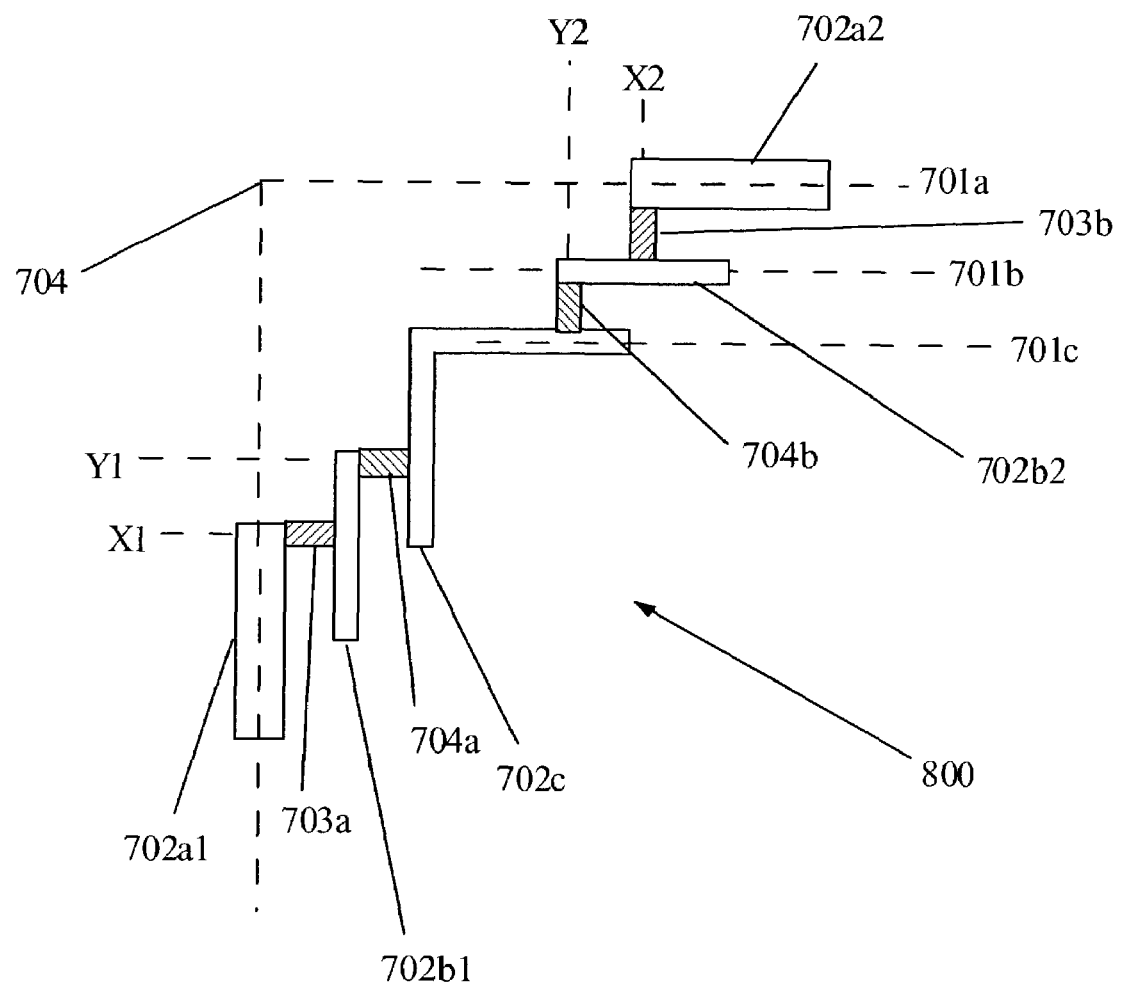
FIG. 7B illustrates a schematic top view of the electrode pattern in FIG. 7A in which electrically non-functional portions of the connected corner segments have been removed.

In one aspect of the present invention if the sheet resistance of the corner segments and the conductive connecting bars is substantially less than the sheet resistance of the transparent conductor onto which they are disposed (the transparent conductor not identified in FIG. 7A), then corner segments 702*a* and 702*b* form a parallel resistive connection between points X1 and X2. In this case, the portion of corner segment 702*a* between points X1 and X2 may become electrically non-functional and, therefore, can be removed with very little or no effect on field linearity. The result is shown in FIG. 7B where after removing the said portion, the corner segment 702*a* is reduced to two remaining portions 702*a*1 and 702*a*2. Similarly, referring back to FIG. 7A, the portion of corner segment 702*b* between points Y1 and Y2 can be electrically non-functional and can be removed with very little or no effect. The result is also shown in FIG. 7B where after removing the said portion, the corner segment 702*b* is reduced to two remaining portions 702*b*1 and 702*b*2.

According to the present invention the number of conductive segments in a given row may be odd or even. Furthermore, the separation between a pair of adjacent rows need not be equal to the separation between another pair of adjacent rows. This point is further illustrated in reference to FIG. 2 where the separation between adjacent rows 203*a* and 203*b* is d1, the separation between adjacent rows 203*b* and 203*c* is d2, and the separation between adjacent rows 203*c* and 203*d* is d3. According to one aspect of the present invention, separations d1, d2, and d3 need not be equal. For example, d1 may be substantially equal to d3 but not to d2. In some embodiments of the present invention the separations d1, d2, and d3 may be equal.

Figure 8:
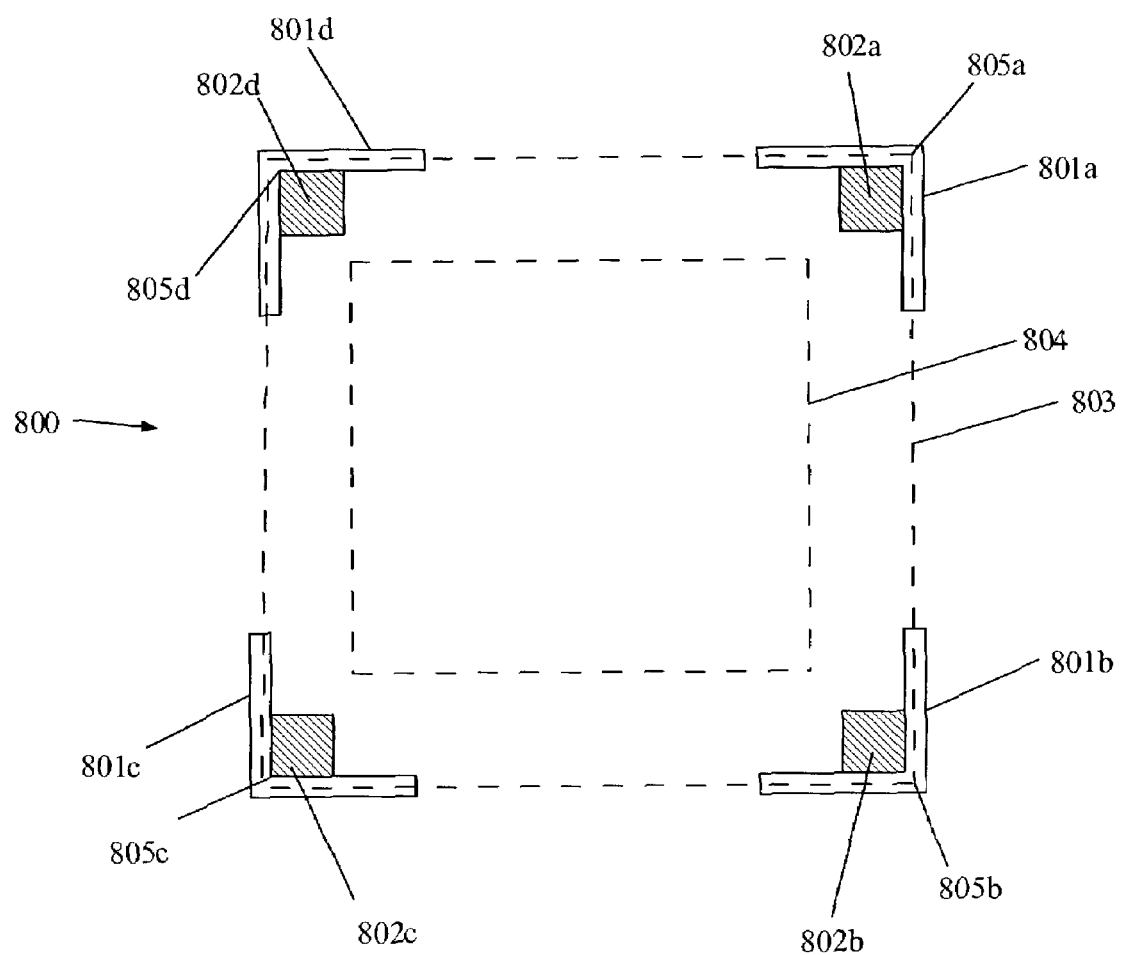
FIG. 8 illustrates a schematic top view of a portion of an electrode pattern in accordance with another embodiment of the invention in which the electrode pattern includes electrical contact pads.

FIG. 8 shows a schematic top view of an electrode pattern 800 in accordance with one particular embodiment of the present invention where electrode pattern 800 incorporates electrical contact pads at one or more vertices along the outermost row. Exemplary electrode pattern 800 is a rectangle having four edges and four vertices and includes an outermost row 803 and an innermost row 804. The outermost row 803 includes four corner segments 801*a*, 801*b*, 801*c*, and 801*d*. For ease of illustration and without any loss of generality only the four corner segments of the outermost row 803 are shown. According to this exemplary aspect of the present invention four rectangular electrical contract pads 802*a*, 802*b*, 802*c*, and 802*d* are placed at the four vertices of the electrode pattern 800 along the outermost row 803. In particular, contact pad 802*a* is placed at vertex 805*a* and is in electrical contact with corner segment 801*a*, contact pad 802*b* is placed at vertex 805*b* and is in electrical contact with corner segment 801*b*, contact pad 802*c* is placed at vertex 805*c* and is in electrical contact with corner segment 801*c*, and contact pad 802*d* is placed at vertex 805*d* and is in electrical contact with corner segment 801*d*. The electrical pads may be used to electrically connect an external touch sensing electronics to the electrode pattern 800 and the transparent conductor onto which the electrode pattern 800 is disposed.

Figure 9:
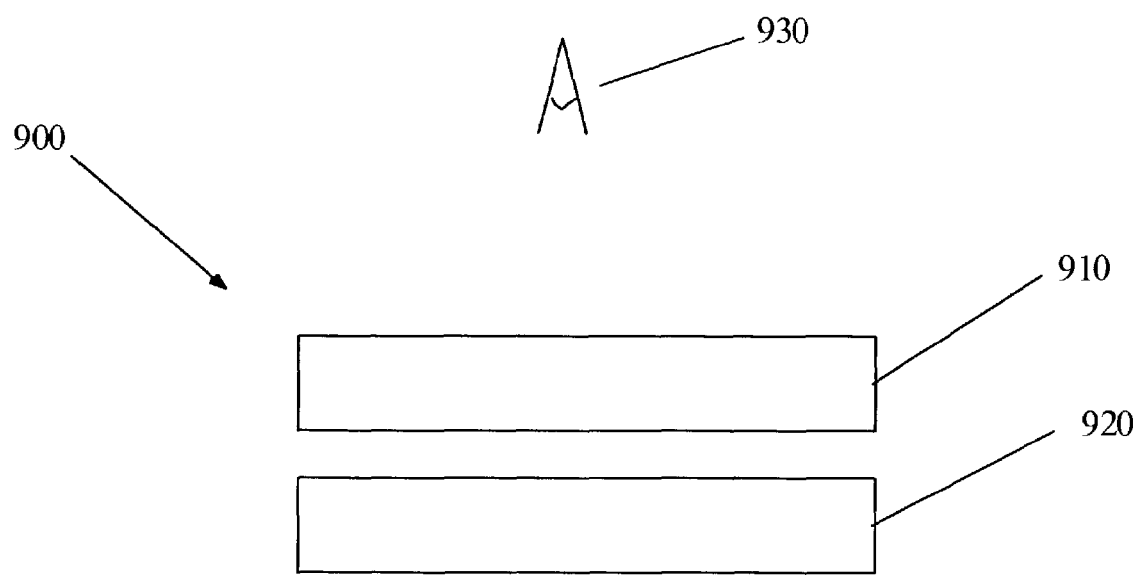
FIG. 9 illustrates a schematic side of view of an optical system in accordance with another embodiment of the invention.

FIG. 9 shows a schematic cross-section of an optical system 900 in accordance with one particular aspect of the present invention. Optical system 900 includes a touch sensor 910 and a display 920 for displaying information to a viewing position 930. Touch sensor 910 incorporates an electrode pattern (not shown in FIG. 9) disclosed in the present invention for linearizing the electric field and for accurate determination of the location of an applied touch. Touch sensor 910 may be a resistive touch sensor, a capacitive touch sensor, or it may be employ any other touch sensing technology that can benefit from incorporating an electrode pattern according to the present invention to improve field linearity for a more accurate determination of the location of a touch input. Examples of display 920 include a liquid crystal display, a cathode ray tube (CRT) display, a light emitting diode display, a plasma display, an organic light emitting display, a field emission display, an electroluminescent display, and other suitable image forming displays. Alternatively, display 920 may be graphics, text, or other indicia displaying information to the viewing position 930.

Figure 11:
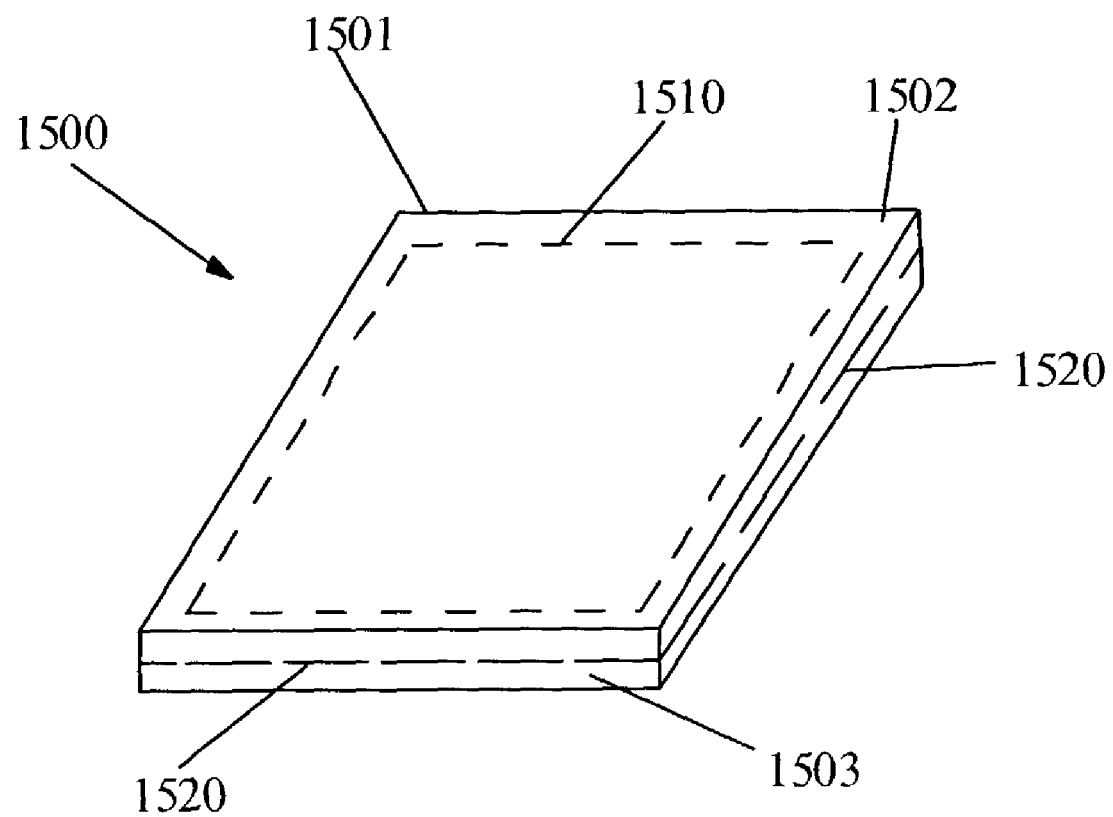
FIG. 11 illustrates a schematic three dimensional view of an electrode pattern in accordance with another embodiment of the invention.

FIG. 11 illustrates a schematic three-dimensional-view of an electrode pattern 1500 according to one particular embodiment of the present invention. Electrode pattern 1500 is formed on a substrate 1501. Substrate 1501 has a top surface 1502, a side surface or edge 1503, and a bottom surface (not identified in FIG. 11). A portion of the electrode pattern 1500, row 1510, is formed on the top surface of the substrate. A different portion of the electrode pattern, row 1520, is formed on the side surface 1503. Although not explicitly shown in FIG. 11, another portion of the electrode pattern 1500 can be formed on the bottom of substrate 1501. For example, electrode pattern 1500 can be first formed on a flexible film. Next, the flexible film can be wrapped around a rigid substrate so that a portion of the electrode pattern is on top of the substrate, a portion along the side of the substrate, and the remaining portion on the bottom of the substrate. Alternatively, the flexible film may be wrapped around a display. An advantage of this aspect of the invention is reduced border size.

Figure 10:
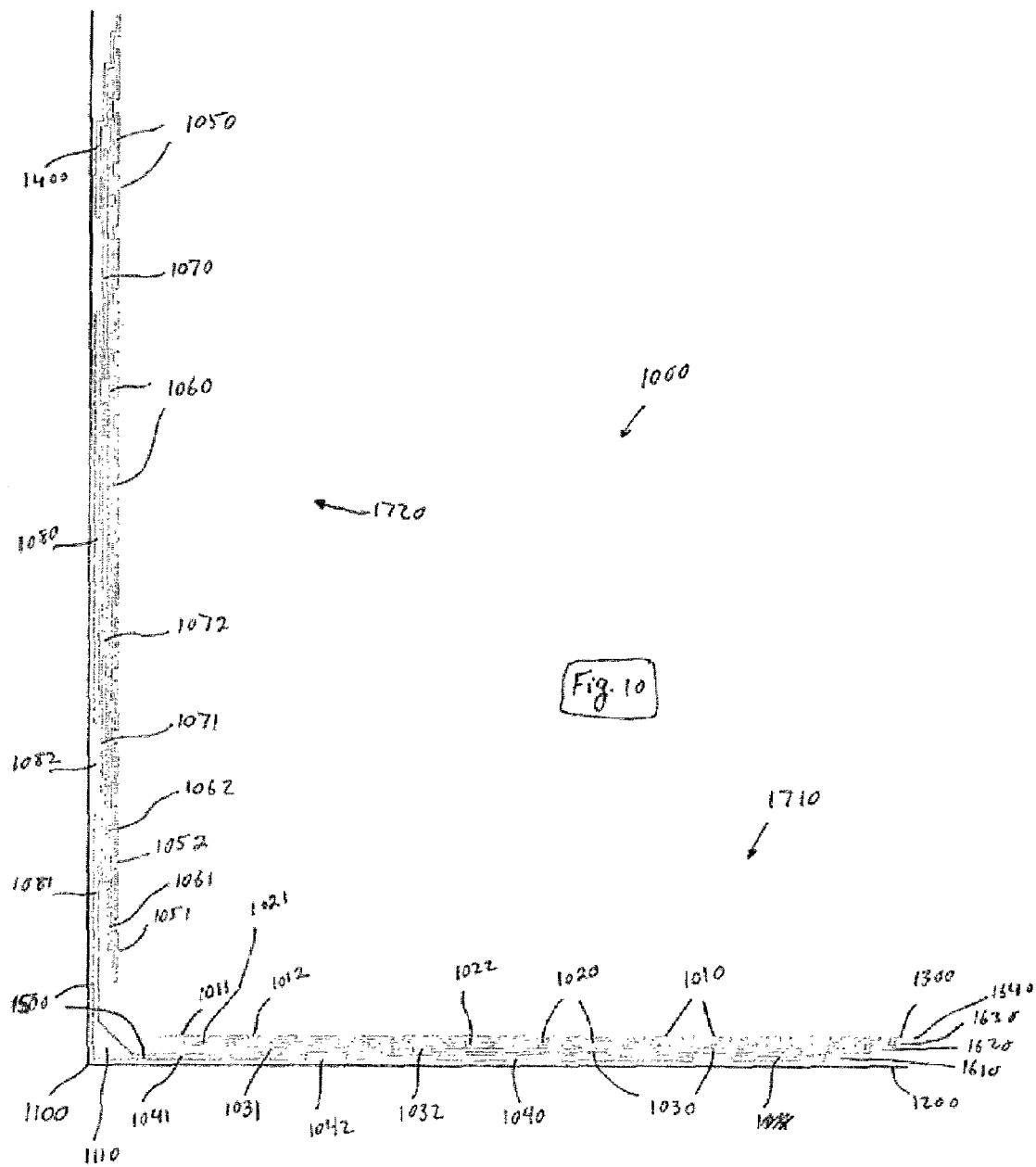
FIG. 10 illustrates a schematic top view of a portion of an electrode pattern in accordance with yet another embodiment of the invention.

A portion of the top view of an electrode pattern 1000 in accordance with one particular embodiment of the present invention is schematically shown in FIG. 10. For ease of viewing and without any loss of generality FIG. 10 shows only one quadrant of the electrode pattern 1000. The other quadrants can easily be constructed by virtue of the two fold symmetry of the electrode pattern 1000. Electrode pattern 1000 has a rectangular shape having four edges and four vertices, and includes four parallel rows 1610, 1620, 1630, and 1640 of conductive segments. Row 1610 is the outermost row of the electrode pattern 1000 and row 1640 is the innermost row of the electrode pattern 1000. Electrode pattern 1000 also includes two short edges and two long edges. FIG. 10 shows a short edge 1710 and a long edge 1720. Electrode pattern 1000 is disposed on a transparent conductor (not identified in FIG. 10). Solid line 1200 identifies the perimeter of the transparent conductor.

Row 1610 includes middle segments 1040, end segments 1041 and gaps 1042 along the short edge, and middle segments 1080, end segments 1081 and gaps 1082 along the long edge.

Row 1620 includes middle segments 1030, end segments 1031 and gaps 1032 along the short edge, and middle segments 1070, end segments 1071 and gaps 1072 along the long edge.

Row 1630 includes middle segments 1020, end segments 1021 and gaps 1022 along the short edge, and middle segments 1060, end segments 1061 and gaps 1062 along the long edge.

Row 1640 includes middle segments 1010, end segments 1011 and gaps 1012 along the short edge, and middle segments 1050, end segments 1051 and gaps 1052 along the long edge.

Table 1 shows the number of middles segments, end segments, and gaps along the short and long edges of electrode pattern 1000.

TABLE 1

| Row Number | Short Edge | | | Long Edge | | |
|---|---|---|---|---|---|---|
| | MS | ES | GS | ML | EL | CL |
| 1610 | 3 | 2 | 4 | 3 | 2 | 4 |
| 1620 | 5 | 2 | 6 | 5 | 2 | 6 |
| 1630 | 13 | 2 | 14 | 13 | 2 | 14 |
| 1640 | 29 | 2 | 30 | 29 | 2 | 30 |

MS is the number of middle segments along the short edge;
ML is the number of middle segments along the long edge;
ES is the number of end segments along the short edge;
EL is the number of end segments along the long edge;
GS is the number of gaps along the short edge; and
GL is the number of gaps along the short edge.

For the outermost row 1610, end segments in all adjoining edges are connected at the vertex to form corner segments. FIG. 10 shows the corner segment 1500 at vertex 1100. The other three corner segments are not shown. Furthermore, triangular conductive electrical pads are placed at the four vertices along the outermost row. Each electrical pad makes electrical contact with the corner segment at the same vertex. For example, in FIG. 10, electrical contact pad 1110 is placed at vertex 1100 along row 1610 and makes electrical contact with corner segment 1500.

According to Table 1, each edge has an odd number of conductive segments, and therefore, each edge has a central middle segment. For each edge, all the central conductive segments in adjacent rows are connected to form a castle (as described in reference to FIGS. 3 and 4). One-half of castle 1300 along short edge 1710 and one-half of castle 1400 along long edge 1720 are shown in FIG. 10. The other two castles are not shown.

EXAMPLE

The electrode pattern 1000 shown in FIG. 10 was numerically modeled using a finite element analysis. The electrode pattern was incorporated in a capacitive touch sensor. The transparent conductor had a perimeter of 27.94 cm (long edge) by 21.59 ch (short edge), and had a sheet resistance of 2500 ohms per square. The sheet resistance of all conductive segments, connecting bars, and contact pads was 0.01 ohms per square. In addition, The following numerical values were used in modeling electrode pattern 1000 of FIG. 10:

separation between perimeter 1200 and row 1610 was 0.076 cm;
width of conductive segments in row 1610 was 0.063 cm;
separation between rows 1610 and 1620 was 0.038 cm;
width of conductive segments in row 1620 was 0.051 cm;
separation between rows 1620 and 1630 was 0.038 cm;
width of conductive segments in row 1630 was 0.038 cm;
separation between rows 1630 and 1640 was 0.038 cm;
width of conductive segments in row 1640 was 0.038 cm;
and
separation between row 1640 (innermost row) and designated touch area was 0.051 cm.

Table 2 shows the relevant dimensions in cm for various rows in FIG. 10.

TABLE 2

| Row Number | Short Edge | | | Long Edge | | |
|---|---|---|---|---|---|---|
| | MSX | ESX | GSX | MLX | ELX | GLX |
| 1610 | 4.587 | 2.294 | 0.518 | 5.456 | 2.728 | 1.237 |
| 1620 | 2.311 | 2.311 | 0.241 | 3.030 | 3.030 | 0.315 |
| 1630 | 1.153 | 1.153 | 0.122 | 1.514 | 1.514 | 0.160 |
| 1640 | 0.516 | 0.516 | 0.122 | 0.676 | 0.676 | 0.160 |

MSX is the length of middle segments along the short edge;
MLX is the length of middle segments along the long edge;
ESX is the length of end segments along the short edge;
ELX is the length of end segments along the long edge;
GSX is the length of each gap along the short edge; and
GLX is the length of each gap along the short edge.

Five volts were applied to the two electrical contact pads along one short edge of the electrode pattern 1000. The other two pads were grounded. All calculated equipotential lines exhibited substantial linearity, and were substantially parallel to the short edge of the sensor. For example, the modeling results showed no deviation from a straight line for the 2.8 volts equipotential line, located between the center of the touch area and the edge energized at 5 volts. The center of this equipotential line was 1.702 cm away from the touch area center.

In the above description, the position of elements has sometimes been described in terms of "top", "bottom", "left", and "right." These terms have been used merely to simplify the illustration of different elements of the invention, such as those illustrated in drawings. They should not be understood to place any limitations on the useful orientation of the elements of the present invention.

All patents, patent applications, and other publications cited above are incorporated by reference into this document as if reproduced in full. While specific examples of the invention are described in detail below to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. An article comprising:
   a transparent conductive surface;
   two or more polygonal parallel rows of conductive segments disposed on the conductive surface, each edge of each row comprising one or more middle conductive segments disposed between two end conductive segments;
   wherein for each edge of each row, the middle segments are substantially equal in length, and the segments are separated by gaps of substantially equal length;
   wherein for each edge, the length of the middle segments in an inner row along the edge is smaller than the length of the middle segments in an outer row along the same edge; and
   wherein at least one segment in a row is connected via one or more conductive bars to a segment in an adjacent row.

2. An article according to claim 1, wherein the polygon is a rectangle.

3. An article according to claim 1, wherein the polygon is a square.

4. An article according to claim 1, wherein the polygon is a triangle.

5. An article according to claim 1, wherein the sheet resistance of the conductive surface is greater than the sheet resistance of the conductive segments.

6. An article according to claim 1, wherein the sheet resistance of the conductive surface is at least ten times greater than the sheet resistance of the conductive segments.

7. An article according to claim 1, wherein the sheet resistance of the conductive surface is at least one hundred times greater than the sheet resistance of the conductive segments.

8. An article according to claim 1, wherein for at least one edge of at least one row, the middle and end conductive segments are substantially equal in length.

9. An article according to claim 1, wherein all middle segments in a given row are substantially equal in length.

10. An article according to claim 1, wherein all segments in a given row are substantially equal in length.

11. Au article according to claim 1, wherein the end segments at a vertex in a row are connected to form a conductive corner segment.

12. An article according to claim 11, wherein at least two rows have corner segments at the same vertex.

13. An article according to claim 1, wherein at least two edges of the polygonal parallel rows are not coplanar.

14. An article according to claim 1, wherein at least two rows of the polygonal parallel rows are not coplanar.

15. An article according to claim 1, wherein one or more conductive segments are optically transmissive.

16. An article according to claim 1, wherein conductive segments in one or more rows are optically transmissive.

17. An article according to claim 12, wherein at least two corner segments at the same vertex are connected via one or more conductive bars.

18. An article according to claim 17, wherein at least some portions of electrically non-functional sections of connected conductive corner segments are removed.

19. An article according to claim 17, wherein the sheet resistance of the conductive bars is substantially equal to the sheet resistance of the corner segments.

20. An article according to claim 1, wherein the number of conductive segments in the outermost row is even.

21. An article according to claim 1, wherein the number of conductive segments in the outermost row is odd.

22. An article according to claim 1, wherein the number of conductive segments is odd for at least one row that is adjacent to an outer row.

23. An article according to claim 1, wherein the number of conductive segments is odd for each row that is adjacent to an outer row.

24. An article according to claim 1, wherein the number of conductive segments is even for at least one row tat is adjacent to an outer row.

25. An article according to claim 1, wherein the number of conductive segments is even for each row that is adjacent to an outer row.

26. An article according to claim 1, wherein the separation between a pair of adjacent rows is substantially the same as the separation between at least one other pair of adjacent rows.

27. An article according to claim 1, wherein the separation between all pairs of adjacent rows is substantially the same.

28. An article according to claim 1, wherein the separation between any pair of adjacent rows is substantially different than the separation between any other pair of adjacent rows.

29. An article according to claim 1, wherein at least some portions of electrically non-functional sections of connected conductive segments are removed.

30. An article according to claim 1, further comprising electrical contact pads disposed on the transparent conductive surface at one or more vertices along the outermost row.

31. An article according to claim 30, wherein the sheet resistance of the contact pads is substantially equal to the sheet resistance of the conductive segments.

32. An article according to claim 30, wherein the end segments at a vertex having a contact pad are connected to the contact pad via one or more conductive bars.

33. An article according to claim 32, wherein the sheet resistance of the conductive bars is substantially equal to the sheet resistance of the conductive segments.

34. An article according to claim 1, wherein the transparent conductive surface comprises a transparent conductive oxide.

35. An article according to claim 34, wherein the transparent conductive oxide comprises indium tin oxide.

36. An article according to claim 34, wherein the transparent conductive oxide comprises tin antimony oxide.

37. An article according to claim 1, wherein the transparent conductive surface comprises a transparent conductive polymer.

38. An article according to claim 1, wherein the conductive segments comprise silver.

39. An article according to claim 1, wherein the conductive segments comprise conductive polymers.

40. An article according to claim 1, wherein the conductive segments comprise carbon.

41. An article according to claim 1, wherein the sheet resistance of the conductive bars is substantially equal to the sheet resistance of the conductive segments.

42. An article according to claim 1, wherein gaps between conductive segments in a given row do not overlap gaps between conductive segments in an adjacent row.

43. An article according to claim 1, wherein said article is incorporated in a touch sensor.

44. An article according to claim 43, wherein the touch sensor is resistive.

45. An article according to claim 43, wherein the touch sensor is capacitive.

46. An article comprising
a transparent conductive surface having a polygonal perimeter; and
two or more rows of conductive segments disposed along and inside the perimeter of the transparent conductive surface, each row having one edge for each edge of the polygon, each edge of each row comprising two end segments and one or more middle segments, the middle segments of each edge of each row being substantially equal in length and all segments of each edge of each row being substantially equal in spacing, the length of the middle conductive segments along each edge being progressively smaller moving from outer to inner rows, the conductive segments being positioned so that gaps between conductive segments in one row do not overlap gaps between conductive segments in an adjacent row, and at least one segment in a row connected via one or more conductive bars to a segment in an adjacent row.

47. A touch sensor comprising
a conductive surface;
two or more concentric parallel polygonal rows of discrete conductive segments disposed on the conductive surface;
each edge of each row having one or more middle conductive segments disposed between two end conductive segments;
wherein for each edge of each row
the middle conductive segments are substantially of equal length; and
the gaps between the conductive segments are substantially of equal length.

48. An optical system for displaying information to a viewer, the optical system comprising:
a display;
a touch sensor comprising
a conductive surface; and
two or more polygonal parallel rows of conductive segments disposed on the transparent conductive surface, each edge of each row comprising two end segments and one or more middle segments disposed between the end segments, the middle segments of each edge of each row being substantially equal in length, all segments of each edge of each row being substantially equal in spacing, the length of the middle conductive segments along each edge being progressively smaller moving from outer to inner rows, the conductive segments being positioned so that gaps between conductive segments in one row do not overlap gaps between conductive segments in an adjacent row, and at least one segment in a row connected via one or more conductive connecting bars to a segment in an adjacent row.

49. An optical system according in claim 48, wherein the display comprises a liquid crystal display.

50. An optical system according to claim 48, wherein the display comprises a cathode ray tube display.

51. An optical system according to claim 48, wherein the display comprises a plasma display.

52. An optical system according to claim 48, wherein the display comprises an organic light emitting display.

53. An optical system according to claim 48, wherein the display comprises graphics.

54. An optical system according to claim 48, wherein the display comprises indicia.

55. An article comprising:
a plurality of conductive segments in contact with a conductive surface, the conductive segments positioned along the edges of two or more concentric parallel polygons, each edge of each polygon having one or more middle segments disposed between two end segments, wherein for each edge of each polygon the middle segments are substantially equal in length, and the segments are substantially equally spaced.

* * * * *

UNITED STATES PATENT AND TRADEMARK OFFICE
CERTIFICATE OF CORRECTION

PATENT NO. : 7,327,352 B2
APPLICATION NO. : 10/172396
DATED : February 5, 2008
INVENTOR(S) : Kenneth J. Keefer It is certified that error appears in the above-identified patent and that said Letters Patent is hereby corrected as shown below:

Column 1,
Line 60, after "deposited" delete "IS".

Column 4,
Line 67, delete "101a, 101b, 101c, and 101d." and insert -- 110a, 110b, 110c, and 110d. --, therefor.

Column 8,
Lines 46-49, delete
"$l_1+g_1=2(l_{1+l}+g_{1+l})$
$n_{1+l}=2n_1\pm1$
$k_{i=ki+1}-1$"

and insert
-- $l_i+g_i=2(l_{i+1}+g_{i+1})$
$n_{i+1}=2n_i+1$
$k_i=k_{i+1}-1$ --, therefor.

Column 9,
Line 66, delete "702al" and insert -- 702a1 --, therefor.

Column 12,
Line 26, after "21.59" delete "ch" and insert -- cm --, therefor.
Line 29, delete "The" and insert -- the --, therefor.

Column 13,
Line 63, in Claim 11, delete "Au" and insert -- An --, therefor.

Column 14,
Line 29, in Claim 24, delete "tat" and insert -- that --, therefor.

UNITED STATES PATENT AND TRADEMARK OFFICE
CERTIFICATE OF CORRECTION

PATENT NO. : 7,327,352 B2
APPLICATION NO. : 10/172396
DATED : February 5, 2008
INVENTOR(S) : Kenneth J. Keefer It is certified that error appears in the above-identified patent and that said Letters Patent is hereby corrected as shown below:

Column 16,
Line 25, in Claim 49, delete "in" and insert -- to --, therefor.

Signed and Sealed this

Twenty-second Day of July, 2008

JON W. DUDAS
*Director of the United States Patent and Trademark Office*